(12) United States Patent
Maeshiro

(10) Patent No.: US 11,738,794 B2
(45) Date of Patent: Aug. 29, 2023

(54) WIRELESS STEERING WHEEL (71) Applicant: Honda Motor Co., Ltd., Tokyo (JP)

(72) Inventor: Shinji Maeshiro, Cypress, CA (US)

(73) Assignee: Honda Motor Co., Ltd., Tokyo (JP)

(*) Notice: Subject to any disclaimer, the term of this patent is extended or adjusted under 35 U.S.C. 154(b) by 665 days.

(21) Appl. No.: 16/826,003

(22) Filed: Mar. 20, 2020

(65) Prior Publication Data
US 2021/0291889 A1 Sep. 23, 2021

(51) Int. Cl.
*B62D 1/04* (2006.01)
*B62D 6/00* (2006.01)
*B62D 15/02* (2006.01)
*B62D 5/04* (2006.01)

(52) U.S. Cl.
CPC ............. *B62D 1/04* (2013.01); *B62D 5/0418* (2013.01); *B62D 6/008* (2013.01); *B62D 15/021* (2013.01)

(58) Field of Classification Search
CPC ........ B62D 1/04; B62D 5/0418; B62D 6/008; B62D 15/021
See application file for complete search history.

(56) References Cited

U.S. PATENT DOCUMENTS

| 11,110,821 B2* | 9/2021 | Luchner | B60K 35/00 |
| 2005/0283288 A1* | 12/2005 | Howell | B62D 1/18 |
| | | | 701/41 |
| 2006/0213755 A1* | 9/2006 | Chang | B60R 16/027 |
| | | | 200/61.54 |
| 2018/0237067 A1* | 8/2018 | Clochard | B60K 37/06 |
| 2020/0298900 A1* | 9/2020 | Palm | B62D 1/181 |

FOREIGN PATENT DOCUMENTS

| CN | 103786776 A | 5/2014 | |
| GB | 2550641 A * | 11/2017 | B62D 1/04 |
| JP | 2004001631 A | 1/2004 | |
| JP | 2006159965 A | 6/2006 | |
| JP | 3793323 B2 | 7/2006 | |
| JP | 4792827 B2 | 10/2011 | |
| JP | 2016060245 A | 4/2016 | |
| KR | 20020033991 A | 5/2002 | |
| TW | M248686 U | 11/2004 | |

* cited by examiner

*Primary Examiner* — Peter D Nolan
*Assistant Examiner* — Demetra R Smith-Stewart
(74) *Attorney, Agent, or Firm* — Stinson LLP (57) ABSTRACT

A steering device includes a frame including an upper portion and a lower portion, and a runner moveable relative to the frame at the upper portion of the frame. The runner includes a plurality of segments longitudinally spaced between a first end and a second end. A sensor is configured to detect at least a first segment of the segments. A controller is communicatively coupled to the sensor. The controller is configured to determine a position of the runner based on the detection of at least the first segment and generate one or more signals based on the position of the runner for use in turning one or more wheels.

20 Claims, 5 Drawing Sheets

WIRELESS STEERING WHEEL

BACKGROUND

Vehicles may be steered using a steering wheel. The steering wheel may be mounted to a steering column and are generally circular in shape. The lower contour of such steering wheels may leave a limited amount of space for a driver to be seated. To increase the amount of space for the driver to be seated, at least some known steering wheels have a generally level or convex-shaped lower portion. Other portions of such steering wheels, however, may inevitably move into the driver's space when the steering wheels are turned. At least some known vehicles may include an adjustable steering column that allows a height of the steering wheel to be adjusted. Raising or tilting the steering wheel beyond a certain point, however, may be undesirable for at least some drivers.

SUMMARY

Examples of this disclosure enable steering a vehicle that includes one or more wheels. In one aspect, a steering device is provided for use with a vehicle including one or more wheels. The steering device may include a frame including an upper portion and a lower portion, and a runner moveable relative to the frame at the upper portion of the frame. The runner may include a plurality of segments longitudinally spaced between a first end and a second end. A sensor may detect at least a first segment of the segments. A controller is communicatively coupled to the sensor. The controller may determine a position of the runner based on the detection of at least the first segment and generate one or more signals based on the position of the runner for use in turning the wheels.

In another aspect, a system is provided. The system may include one or more wheels, one or more actuators configured to turn the wheels, and a user interface. The user interface may include a frame including an upper portion and a lower portion, a runner moveable relative to the frame at the upper portion of the frame, and a sensor to detect one or more segments of the runner. A controller may be communicatively coupled to the sensor. The controller may determine a position of the runner based on the detection of at least a first segment of the segments and generate one or more signals based on the position of the runner for use in turning the wheels.

In yet another aspect, a method is provided for steering a vehicle including one or more wheels. The method may include detecting one or more segments of a runner that is moveable relative to a frame at an upper portion of the frame, determining a position of the runner based on the detection of the segments, and generating one or more signals based on the position of the runner for use in turning the one or more wheels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The novel features believed to be characteristic of the disclosure are set forth in the appended claims. The drawings are not necessarily drawn to scale and certain drawings may be shown in exaggerated or generalized form in the interest of clarity and conciseness. The disclosure itself, however, will be best understood by reference to the following Detailed Description when read in conjunction with the accompanying drawings, wherein:

Like parts are marked throughout the drawings, as well as throughout the Detailed Disclosure, with the same numerals. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to vehicle systems and, more particularly, to a steering device that may be used to operate a vehicle. Examples of this disclosure may include a frame including an upper portion and a lower portion, and a runner moveable relative to the frame at the upper portion of the frame. In this manner, a driver of the vehicle may be comfortably seated while operating the vehicle in a desired environment. Examples described herein are configured to operate using one or more computer systems that are communicatively coupled to one or more sensors and operably connected to one or more actuators. For example, a controller may be configured to determine a position of the runner and generate one or more signals based on the position of the runner for use in turning one or more wheels of the vehicle. While the examples described herein are described with respect to the operation of vehicles, one of ordinary skill in the art would understand and appreciate that the subject matter described herein may be used to operate any asset in any environment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be or include, for example, magnetic tape, a floppy disk, a hard disk, a compact disc (CD), a digital versatile disc (DVD), a memory card, and/or a flash drive. The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include non-volatile memory and/or volatile memory. Non-volatile memory can include, for example, read-only memory (ROM), programmable ROM (PROM), erasable PROM (EPROM), electrically erasable PROM (EEPROM), solid-state drives, and/or disks. Volatile memory can include, for example, random-access memory (RAM), static RAM (SRAM), dynamic RAM (DRAM), synchronous DRAM (SDRAM), and/or double data rate SDRAM (DDR SDRAM). The memory can store an operating system that controls or allocates resources of a computing device.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various units to execute various functions.

A "unit", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another unit, method, and/or system. A unit may also include logic, a software controlled microprocessor, a discrete logic circuit, an analog circuit, a digital circuit, a programmed logic device, a memory device containing executing instructions, logic gates, a combination of gates, and/or other circuit components. Multiple units may be combined into one unit and single units may be distributed among multiple units.

A "vehicle", as used herein, refers to any moving vehicle that is capable of carrying one or more human occupants and is powered by any form of energy. The term "vehicle" includes, but is not limited to: cars, trucks, vans, minivans, sport utility vehicles (SUVs), motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with predetermined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage. In other cases, the value or level of X could be a value in a range. In still other cases, the value or level of X may not be a numerical value, but could be associated with a given discrete state, such as "not X", "slightly x", "x", "very x" and "extremely x."

Figure 1:
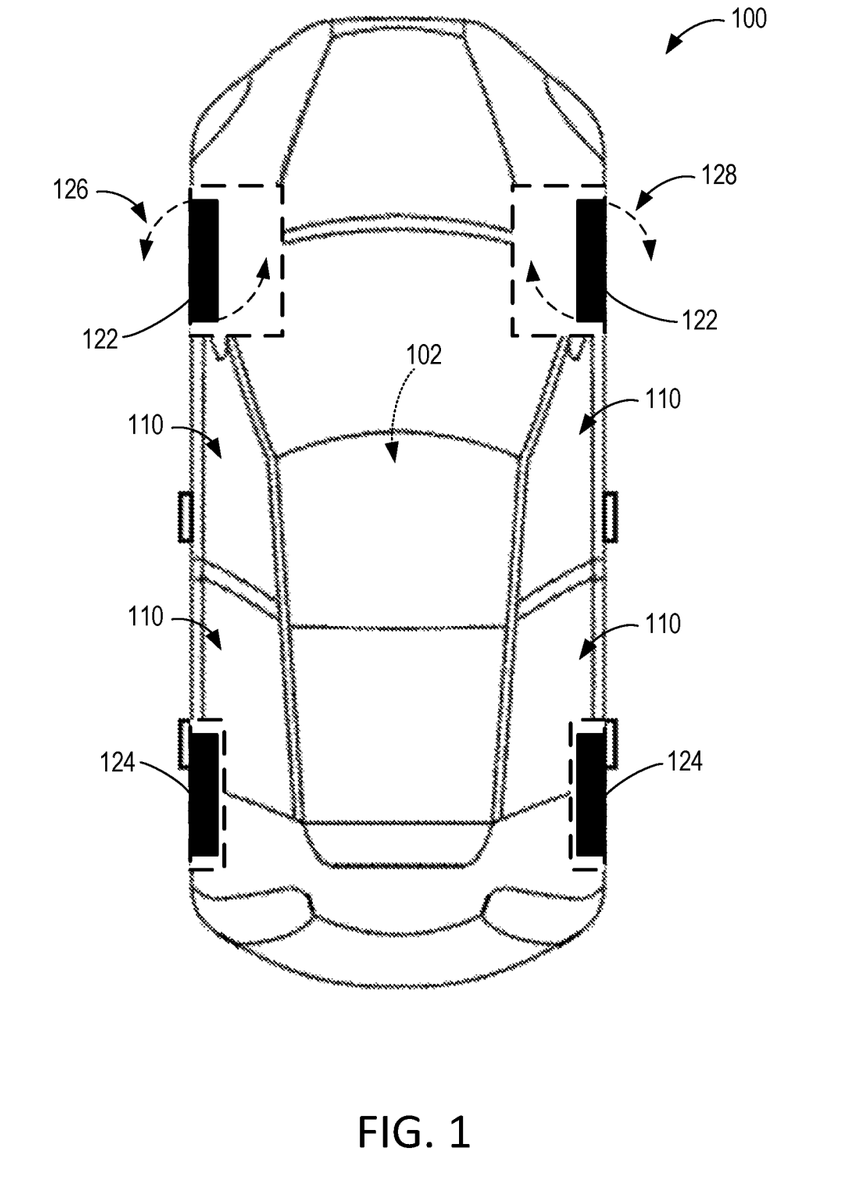
FIG. 1 is a schematic view of an example vehicle.

Referring now to the drawings, which are provided for purposes of illustrating one or more examples and not for purposes of limiting the same, with reference to FIG. 1, an example vehicle 100 includes an interior passenger space or cabin 102 configured to accommodate one or more occupants. The vehicle 100 includes one or more doors 110 that allow the occupants to enter into and leave from the cabin 102. While the cabin 102 is described and shown to include four doors 110, one of ordinary skill in the art would understand and appreciate that the vehicle 100 described herein may include any quantity of doors in various arrangements.

As shown in FIG. 1, the vehicle 100 may include one or more front wheels 122 and/or one or more rear wheels 124. The front wheels 122 and/or rear wheels 124 are configured to turn or rotate about a yaw axis to facilitate steering the vehicle 100. For example, the front wheels 122 may be selectively turned in a first direction 126 (e.g., counterclockwise with respect to the perspective shown in FIG. 1) to steer the vehicle 100 towards the left or in a second direction 128 (e.g., clockwise with respect to the perspective shown in FIG. 1) to steer the vehicle 100 towards the right. While the vehicle 100 is described and shown to include four wheels (e.g., front wheels 122 and rear wheels 124), one of ordinary skill in the art would understand and appreciate that the vehicle 100 described herein may include any quantity of wheels in various arrangements.

Figure 2:
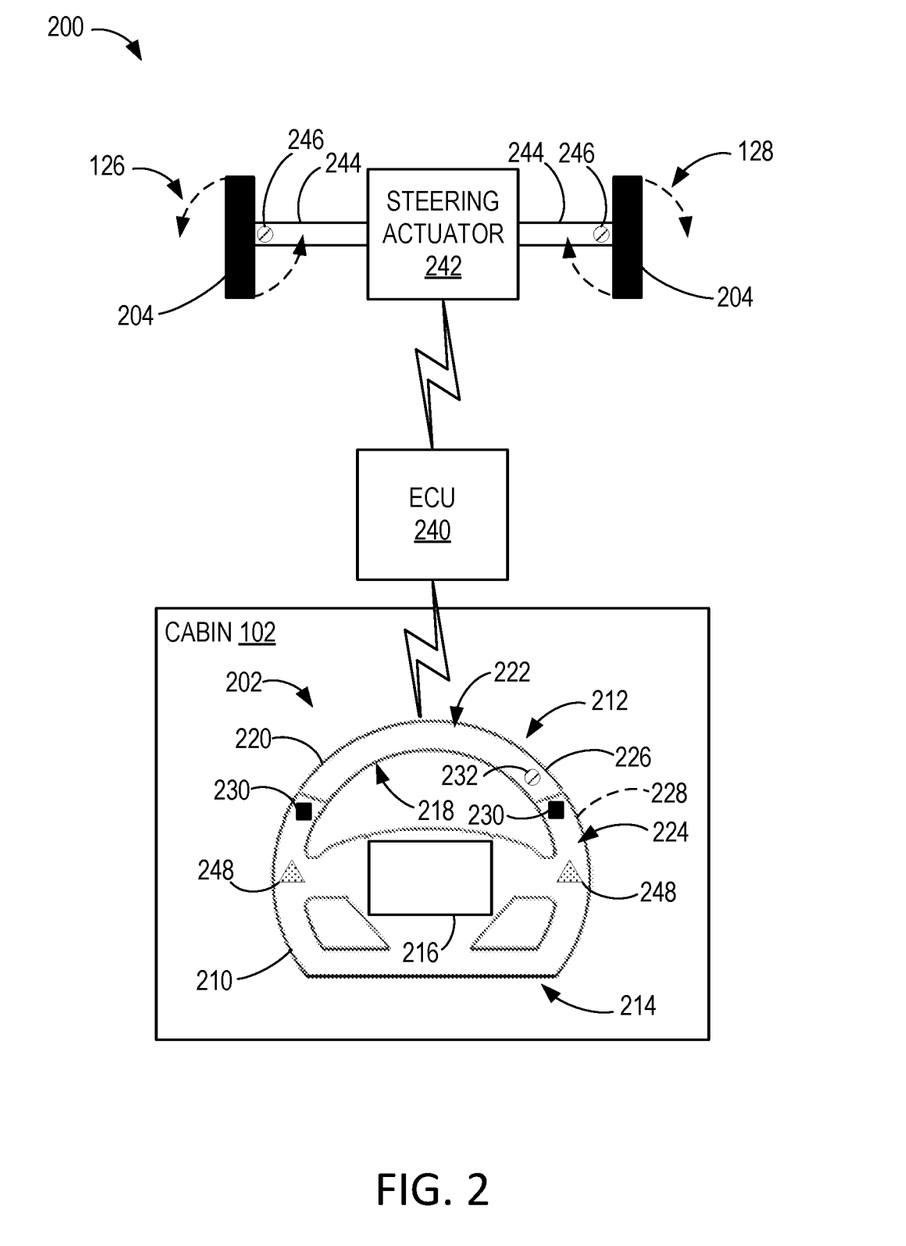
FIG. 2 is a schematic view of an example steer-by-wire system that may be used to operate a vehicle, such as the vehicle shown in FIG. 1.

FIG. 2 shows an example steer-by-wire system 200 that may be used to operate the vehicle 100 (shown in FIG. 1). As shown in FIG. 2, the system 200 may include a steering wheel 202 for use in turning one or more wheels 204 (e.g., front wheel 122, rear wheel 124) about a yaw axis.

The steering wheel 202 may include a frame 210 including an upper portion 212 and a lower portion 214. In some examples, the upper portion 212 has a convex configuration, and/or the lower portion 214 has a level or concave configuration. Alternatively, the steering wheel 202 may have any configuration that enables the system 200 to function as described herein.

In some examples, the steering wheel 202 may include an instrument panel 216 coupled to the frame 210. As shown in FIG. 2, the instrument panel 216 may be positioned within a footprint of the frame 210 (e.g., between the upper portion 212 and lower portion 214). The instrument panel 216 may include, for example, one or more gauges or instruments that present various conditions associated with the vehicle 100. Example gauges or instruments include, without limitation, speedometers, tachometers, odometers, engine coolant temperature gauges, fuel gauges, fuel-economy gauges, turn indicators, gearshift position indicators, and/or warning lights.

In some examples, the steering wheel 202 may include a track 218 and a runner 220 configured to move along the track 218 for use in operating the vehicle 100. An occupant of the vehicle 100 (e.g., a driver), for example, may move the runner 220 toward a neutral position to move the wheels 204 toward a generally straight direction. Additionally, the driver may move the runner 220 away from the neutral position to move the wheels 204 away from the straight direction (e.g., to turn left or right).

In some examples, the frame 210 is generally fixed at one location within the cabin 102 while the runner 220 is moveable relative to the frame 210. For example, as shown in FIG. 2, the track 218 may extend generally laterally across the upper portion 212 of the frame 210 such that the runner 220 is configured to move leftward and/or rightward at the upper portion 212 of the frame 210. In some examples, the wheels 204 are configured to turn or rotate about the yaw axis in a first direction 126 (e.g., to turn left) when the runner 220 is moved leftward, and turn or rotate about the yaw axis in a second direction 128 (e.g., to turn right) when the runner 220 is moved rightward.

In some examples, the frame 210 may include an open portion 222 exposing the runner 220 and a closed portion 224 housing the runner 220. As shown in FIG. 2, a first segment 226 of the runner 220 at the open portion 222 may be generally accessible to the driver, and a second segment 228 of the runner 220 longitudinally spaced from the first segment 226 and at the closed portion 224 is shielded from the driver. During use, one or more segments of the runner 220 that are accessible to the driver for handling and/or use may change. For example, as the runner 220 moves along the track 218, the first segment 226 may move toward the closed portion 224 and/or the second segment 228 may move toward the open portion 222.

The steering wheel 202 may include one or more steering sensors 230 that may be used to track or monitor a position and/or movement of the runner 220. In some examples, the steering sensors 230 are coupled to the frame 210 at one or more predetermined locations along or adjacent to the track 218. Example steering sensors 230 include, without limitation, optical sensors, proximity sensors, position sensors, speed sensors, force sensors, torque sensors, potentiometers, electromagnetic sensors, inertial measurement units (IMUs), accelerometers, and/or gyroscopes.

In some examples, the runner 220 may include one or more markers 232 that allow a position and/or movement of the runner 220 to be tracked or monitored. The steering sensors 230 may be configured, for example, to detect the markers 232, and generate data and/or sensor signals associated with the markers 232. In some examples, the markers 232 are longitudinally spaced along a length of the runner 220. The first segment 226 and second segment 228, for example, may each include a respective marker 232. The markers 232 may be coded such that each marker 232 is uniquely identifiable. In this manner, each segment of the runner 220 including or associated with a marker 232 may be tracked or monitored.

The system 200 may include one or more controllers or electronic control units (ECUs) 240 communicatively coupled to the steering sensors 230 for use in determining a steering input. The ECUs 240 may be configured, for example, to receive sensor signals from the steering sensors 230 and analyze the sensor signals to determine the position and/or movement of the runner 220.

The ECUs 240 may be operably connected to one or more steering actuators 242 for use in controlling the wheels 204 (e.g., via steering hardware 244). In some examples, the ECUs 240 are configured to generate one or more instructions and/or control signals based on sensor signals received from the steering sensors 230 and transmit the control signals to the steering actuators 242 for controlling the wheels 204 in accordance with the steering input. In this manner, the wheels 204 may be positioned and/or turned in accordance with the position and/or movement of the runner 220.

In some examples, the steering wheel 202 may be configured to provide or present tactile feedback (e.g., a steering "feel") to the driver. Tactile feedback may be provided, for example, to communicate how the vehicle 100 and/or wheels 204 are reacting to the road surface. In some examples, the steer-by-wire system 200 includes one or more feedback sensors 246 configured to detect one or more stimuli at or adjacent to the wheels 204, steering hardware 244, and/or steering actuators 242 (e.g., forces) and generate data and/or sensor signals associated with the stimuli. Load data, for example, may be generated based on vibration captured by the feedback sensors 246. The feedback sensors 246 may be used to track or monitor a rotation, road speed, slip angle, camber angle, vertical load, lateral force, centrifugal force, force variation, tension, strain, and/or torque of the wheels 204, steering actuators 242, and/or steering hardware 244 for use in determining a position, orientation, and/or force associated with the wheels 204, steering actuators 242, and/or steering hardware 244. Example feedback sensors 246 include, without limitation, optical sensors, proximity sensors, position sensors, wheel speed sensors, yaw rate sensors, lateral acceleration sensors, force sensors, torque sensors, IMUS, accelerometers, and/or gyroscopes.

The ECUs 240 are communicatively coupled to the feedback sensors 246 and operatively connected to one or more feedback actuators 248 at or adjacent to the steering wheel 202 for use in providing or presenting tactile feedback in accordance with the position, orientation, and/or force associated with the wheels 204, steering actuators 242, and/or steering hardware 244. The ECUs 240 may be configured to receive sensor signals from the feedback sensors 246 and analyze the sensor signals to determine the position, orientation, and/or force associated with the wheels 204, steering actuators 242, and/or steering hardware 244. In some examples, the ECUs 240 are configured to generate one or more instructions and/or control signals based on sensor signals received from the feedback sensors 246 and transmit the control signals to the feedback actuators 248 for providing or presenting tactile feedback at the steering wheel 202.

In some examples, the feedback actuators 248 are used to adjust a resistance of the steering wheel 202. The resistance of the steering wheel 202 may be increased, for example, by using the feedback actuators 248 to restrict or prevent the runner 220 from moving in one or more directions. In some examples, the feedback actuators 248 are used to force or urge the runner 220 toward one direction while the runner 220 is moving or being urged to move in the opposite direction. The resistance of the steering wheel 202 may be increased, for example, when the steering wheel 202 and/or wheels 204 are at or approaching an end of the steering range. Additionally or alternatively, the resistance of the steering wheel 202 may be increased to prevent the driver from steering the vehicle 100 toward a detected hazard or obstacle. The ECUs 240 may communicate with one or more sources other than the steering sensors 230 and feedback sensors 246, such as a global positioning system (GPS) device, a local positioning system (LPS) device, and/or a vision positioning system (VPS) device, for example, to detect and/or identify one or more hazards or obstacles.

In some examples, the ECUs 240 are configured to adjust a sensitivity of the steering wheel 202. The sensitivity of the steering wheel 202 may be adjusted, for example, by changing a steering ratio of the vehicle 100. Increasing the steering ratio may increase an amount the runner 220 is to be moved in order to turn the wheels 204 a particular amount (i.e., decrease the sensitivity of the steering wheel 202). Conversely, decreasing the steering ratio may decrease an amount the runner 220 is to be moved in order to turn the wheels 204 a particular amount (i.e., increase the sensitivity of the steering wheel 202).

In some examples, the ECUs 240 are configured to provide a variable steering ratio. For example, the ECUs 240 may provide one steering ratio when the vehicle 100 is moving at a lower road speed (e.g., to enable quicker maneuvering) and another steering ratio when the vehicle 100 is moving at a higher road speed (e.g., to avoid sudden turns). For another example, the ECUs 240 may provide one steering ratio when the runner 220 is at or closer to the neutral position and another steering ratio when the runner 220 is farther from the neutral position.

In some examples, the ECUs 240 are configured to communicate with the steering actuators 242, steering sensors 230, feedback sensors 246, and/or feedback actuators 248 using one or more wireless communication protocols. Example wireless communication protocols include, without limitation, wireless protocols, a BLUETOOTH® brand communication protocol, a ZIGBEE® brand communication protocol, a Z-WAVE™ brand communication protocol, a WI-FI® brand communication protocol, a near field communication (NFC) communication protocol, a radio frequency (RF) communication protocol, an infrared (IR) communication protocol, an ultrasound (US) communication protocol, and/or a cellular data communication protocol. (BLUETOOTH® is a registered trademark of Bluetooth Special Interest Group, ZIGBEE® is a registered trademark of ZigBee Alliance Corporation, Z-WAVE™ is a trademark of Sigma Designs, Inc., and WI-FI® is a registered trademark of the Wi-Fi Alliance.).

Figure 3:
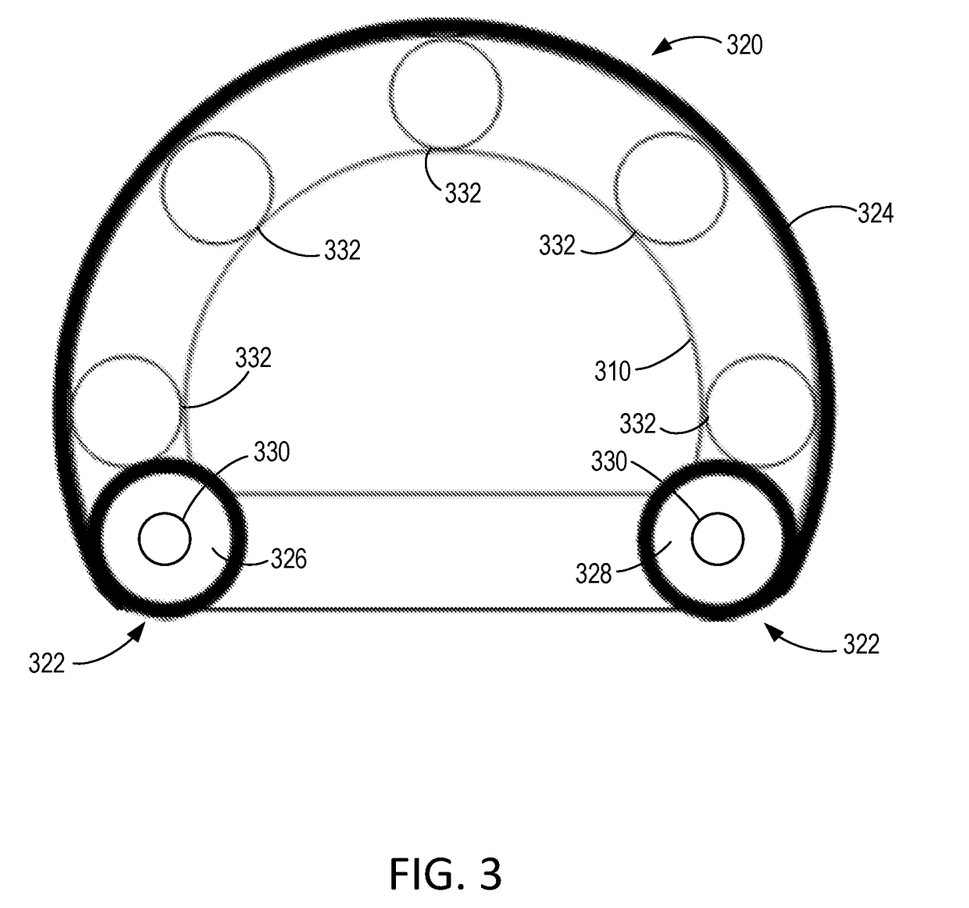
FIG. 3 is an illustration of an example user interface that may be used to operate a vehicle, such as the vehicle shown in FIG. 1.

FIG. 3 shows an example user interface 300 (e.g., steering wheel 202) including an inner race 310 (e.g., frame 210) and an outer race 320 (e.g., runner 220). In some examples, the inner race 310 is generally fixed at one location within the cabin 102 while the outer race 320 is moveable relative to the inner race 310. For example, as shown in FIG. 3, the inner race 310 may include one or more reels 322, and the outer race 320 may include a strip 324 extending from the reels 322. The strip 324 may extend generally laterally across an upper portion of the inner race 310. In some examples, the strip 324 includes a first end connected to a first reel 326, a second end connected to a second reel 328, and a body extending between the first reel 326 and second reel 328.

The reels 322 may rotate to wind up or pay out the strip 324 as the strip 324 is selectively moved along a track 218 defined at an outer surface of the inner race 310. In some examples, the strip 324 is configured to wind around the first reel 326 while paying out from the second reel 328 when the strip 324 is moved in a first direction (e.g., toward the first reel 326, away from the second reel 328), and wind around the second reel 328 while paying out from the first reel 326 when the strip 324 is moved in a second direction opposite the first direction (e.g., away from the first reel 326, toward the second reel 328). In some examples, the steering device 300 includes one or more biased mechanisms 330 configured to increase a tension of the strip 324 (e.g., via controlled rotation of the reels 322). In this manner, the strip 324 may be taut along the track 218.

In some examples, the user interface 300 may include a plurality of balls or rollers 332 that facilitate reducing friction between the inner race 310 and outer race 320. The rollers 332 may be, for example, coupled to the outer surface of the inner race 310 and/or to an inner surface of the outer race 320. The user interface 300 may include one or more feedback actuators 248 (e.g., linear motor, spring, magnet) configured to adjust a resistance of the user interface 300. The resistance of the user interface 300 may be increased, for example, when the first end and/or second end has paid out from the first reel 326 and/or second reel 328, respectively. In some examples, the outer race 320 includes one or more ferromagnetic and/or electromagnetic materials (e.g., magnets) to facilitate providing or presenting tactile feedback (e.g., variable resistance).

Figure 4:
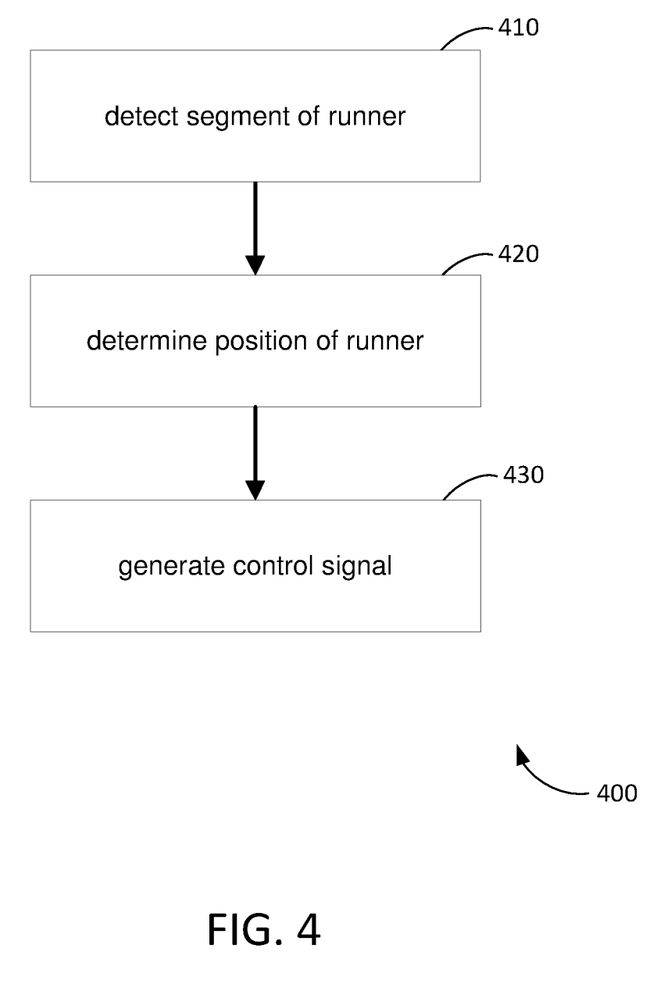
FIG. 4 is a flowchart of an example method of steering a vehicle, such as the vehicle shown in FIG. 1.

FIG. 4 shows various operations of an example method 400 of steering a vehicle 100 (shown in FIG. 1) including one or more wheels 204 (e.g., front wheel 122, rear wheel 124). The method 400 will be described with reference to the components of FIG. 1 and FIG. 2, though it is to be appreciated that the method 400 may be used with other systems (e.g., user interface 300) and/or components (e.g., reels 322, strip 324, biased mechanisms 330, rollers 332).

An occupant of a vehicle 100 (e.g., a driver) may use a steering wheel 202 (e.g., user interface 300) to operate the vehicle 100. The user interface includes a frame 210 (e.g., inner race 310), a runner 220 (e.g., outer race 320) moveable relative to the frame 210, and a steering sensor 230 configured to detect a position and/or movement of the runner 220. In some examples, a segment of the runner 220 (e.g., first segment 226, second segment 228) is detected at operation 410. In this manner, the steering sensor 230 may be used to monitor the driver's inputs and determine whether or how to move the vehicle 100 in accordance with the driver's inputs. In some examples, the user interface includes an instrument panel 216 within a footprint of the frame 210.

When the driver moves the runner 220, the steering sensor 230 relays the driver's input to an ECU 240. The ECU 240 determines a position of the runner 220 at operation 420. The position of the runner 220 may be determined, for example, based on the detection of the first segment 226 and/or second segment 228. The ECU 240 then assesses the driver's input, along with other information (e.g., road speed, yaw rate, GPS data, LPS data, VPS data), to generate one or more control signals at operation 430 for use in turning one or more wheels 204 of the vehicle 100. The control signals may be transmitted, for example, to one or more steering actuators 242 to physically actuate the wheels 204 in accordance with the driver's inputs. In some examples, the ECU 240 determine whether or how to provide or present tactile feedback to the driver in accordance with one or more interactions between the wheels 204 are the road surface.

Figure 5:
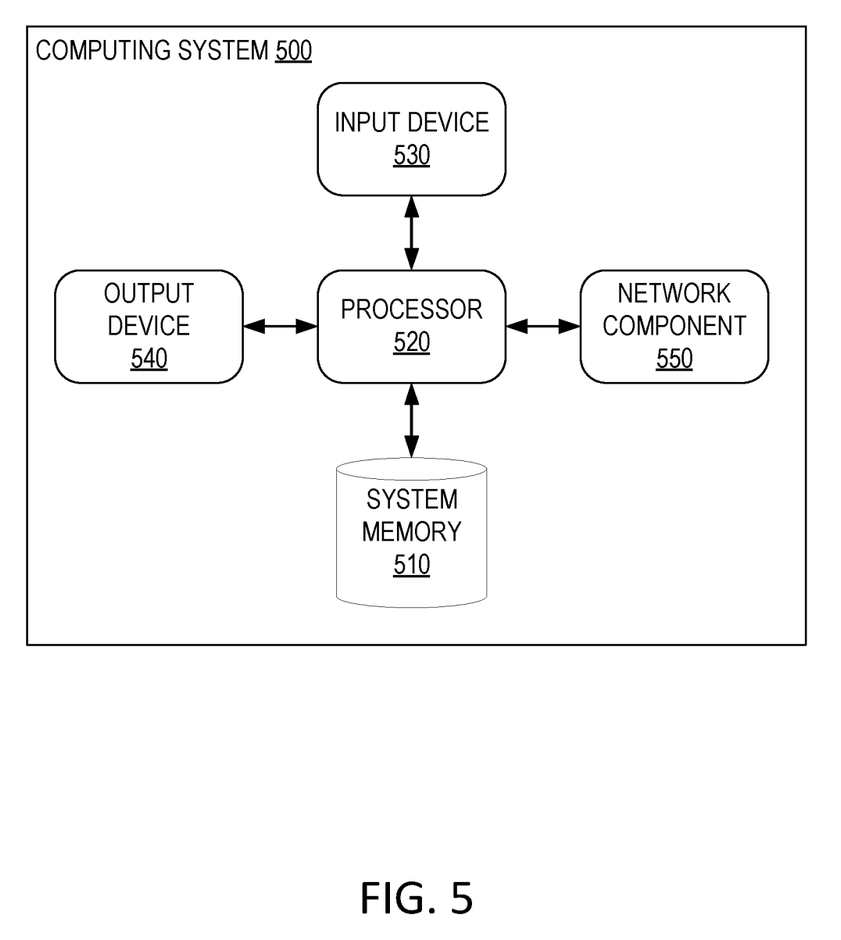
FIG. 5 is a block diagram of an example computing system that may be used to steer a vehicle, such as the vehicle shown in FIG. 1.

FIG. 5 shows an example computing system 500 configured to perform one or more computing operations. While some examples of the disclosure are illustrated and described herein with reference to the computing system 500 being included in an ECU 240 (shown in FIG. 2), aspects of the disclosure are operable with any computing system (e.g., steering wheel 202, instrument panel 216, steering sensor 230, steering actuator 242, feedback sensor 246, feedback actuator 248) that executes instructions to implement the operations and functionality associated with the computing system 500. The computing system 500 shows only one example of a computing environment for performing one or more computing operations and is not intended to suggest any limitation as to the scope of use or functionality of the disclosure.

In some examples, the computing system 500 includes a system memory 510 (e.g., computer storage media) and a processor 520 coupled to the system memory 510. The processor 520 may include one or more processing units (e.g., in a multi-core configuration). Although the processor 520 is shown separate from the system memory 510, examples of the disclosure contemplate that the system memory 510 may be onboard the processor 520, such as in some embedded systems.

The system memory 510 stores data associated with one or more users (e.g., drivers), vehicles 100, and/or steering wheels 202, and computer-executable instructions, and the processor 520 is programmed or configured to execute the computer-executable instructions for implementing aspects of the disclosure using, for example, one or more ECUs 240. For example, at least some data may be associated with one or more users (e.g., drivers), vehicles 100, and/or steering wheels 202, such that the computer-executable instructions enable the processor 520 to manage or control one or more operations of a vehicle 100 and/or ECUs 240.

The system memory 510 includes one or more computer-readable media that allow information, such as the computer-executable instructions and other data, to be stored and/or retrieved by the processor 520. In some examples, the processor 520 executes the computer-executable instructions to detect one or more segments (e.g., first segment 226, second segment 228) of a runner 220 (e.g., outer race 320) that is moveable relative to a frame 210 (e.g., inner race 310), determine a position of the runner 220 based on the detection, and generate one or more signals based on the determination for use in turning one or more wheels 204 of a vehicle 100.

By way of example, and not limitation, computer-readable media may include computer storage media and communication media. Computer storage media are tangible and mutually exclusive to communication media. For example, the system memory 510 may include computer storage media in the form of volatile and/or nonvolatile memory, such as read-only memory (ROM), programmable ROM (PROM), erasable PROM (EPROM), electrically erasable PROM (EEPROM), solid-state drives, magnetic tape, a floppy disk, a hard disk, a compact disc (CD), a digital versatile disc (DVD), a memory card, a flash drive, random-access memory (RAM), static RAM (SRAM), dynamic RAM (DRAM), synchronous DRAM (SDRAM), double data rate SDRAM (DDR SDRAM), and/or any other medium that may be used to store desired information that may be accessed by the processor 520. Computer storage media are implemented in hardware and exclude carrier waves and propagated signals. That is, computer storage media for purposes of this disclosure are not signals per se.

A user or operator may enter commands and other input into the computing system 500 through one or more input devices 530 coupled to the processor 520. The input devices 530 are configured to receive information. Example input device 530 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 540 coupled to the processor 520. The output devices 540 are configured to convey information. Example output devices 540 include, without limitation, a monitor, a projector, a printer, a speaker, a vibrating component. In some examples, an output device 540 is integrated with an input device 530 (e.g., a capacitive touch-screen panel, a controller including a vibrating component).

One or more network components 550 may be used to operate the computing system 500 in a networked environment using one or more logical connections. Logical connections include, for example, local area networks, wide area networks, and the Internet. The network components 550 allow the processor 520, for example, to convey information to and/or receive information from one or more remote devices, such as another computing system or one or more remote computer storage media. Network components 550 may include a network adapter, such as a wired or wireless network adapter or a wireless data transceiver.

Example systems and methods for steering vehicles are described herein and illustrated in the accompanying drawings. For example, the ECUs described herein are configured to detect a runner that is moveable relative to a frame, determine a position of the runner based on the detection, and generate one or more signals based on the determination for use in turning one or more wheels of the vehicle. Examples described herein enable the frame of the steering wheel to remain stationary. In this manner, an instrument panel positioned at the steering wheel may remain in an upright position. Moreover, the steering wheel may remain free from a driver's space below the steering wheel, allowing the driver to remain comfortably seated while operating the vehicle. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

It should be apparent from the foregoing description that various examples may be implemented in hardware. Furthermore, various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

When introducing elements, the articles "a", "an", "the" and "said" are intended to mean that there are one or more of the elements. References to an "embodiment" or an "example" of the present disclosure are not intended to be interpreted as excluding the existence of additional embodiments or examples that also incorporate the recited features. The terms "comprising", "including" and "having" are intended to be inclusive and mean that there may be additional elements other than the listed elements. The phrase "one or more of the following: A, B, and C" means "at least one of A and/or at least one of B and/or at least one of C."

In view of the above, it will be seen that the several objects of the disclosure are achieved and other advantageous results attained.

The invention claimed is:

1. A steering device for use with a vehicle including one or more wheels, the steering device comprising:
   a frame including an upper portion and a lower portion;
   a runner moveable relative to the frame at the upper portion of the frame, the runner including a plurality of segments longitudinally spaced between a first end and a second end;
   a sensor configured to detect at least a first segment of the plurality of segments; and
   a controller communicatively coupled to the sensor, the controller configured to determine a position of the runner relative to the frame based on the detection of at least the first segment and generate one or more signals based on the position of the runner relative to the frame for use in turning the one or more wheels.

2. The steering device of claim 1, further comprising an instrument panel between the upper portion and the lower portion.

3. The steering device of claim 1, wherein the frame defines a track along which the runner is configured to move.

4. The steering device of claim 3, wherein the track extends generally laterally across the steering device at the upper portion of the frame.

5. The steering device of claim 1, wherein the frame includes an open portion, at which the runner is accessible to a user, and a closed portion, at which the runner is shielded from the user.

6. The steering device of claim 1, wherein the frame includes an inner race, and the runner includes an outer race.

7. The steering device of claim 1, wherein the frame includes one or more reels, wherein a first reel of the one or more reels is rotatable to wind up or pay out the runner.

8. The steering device of claim 1, further comprising one or more biased mechanisms configured to increase a tension of the runner.

9. The steering device of claim 1, wherein the runner includes one or more markers, the first segment including a first marker of the one or more markers.

10. The steering device of claim 9, wherein the first marker is coded.

11. The steering device of claim 1, further comprising one or more feedback actuators configured to urge the runner toward a first direction as the runner moves in a second direction opposite the first direction.

12. A system comprising:
   one or more wheels;
   one or more actuators configured to turn the one or more wheels;
   a user interface comprising a frame including an upper portion and a lower portion, a runner moveable relative to the frame at the upper portion of the frame, and a sensor configured to detect one or more segments of the runner; and
   a controller communicatively coupled to the sensor, the controller configured to determine a position of the runner relative to the frame based on the detection of at least a first segment of the one or more segments and generate one or more signals based on the position of the runner relative to the frame for use in turning the one or more wheels.

13. The system of claim 12, wherein the frame defines a track along which the runner is configured to move, the track extending generally laterally across the user interface at the upper portion of the frame.

14. The system of claim 12, wherein the frame includes an open portion, at which the runner is accessible to a user, and a closed portion, at which the runner is shielded from the user.

15. The system of claim 12, wherein the frame includes an inner race, and the runner includes an outer race.

16. The system of claim 12, wherein the frame includes one or more reels, wherein a first reel of the one or more reels is rotatable to wind up or pay out the runner.

17. The system of claim 12, wherein the user interface includes one or more biased mechanisms configured to increase a tension of the runner.

18. The system of claim 12, wherein the runner includes one or more markers, the first segment including a first marker of the one or more markers.

19. The system of claim 12, wherein the user interface includes one or more feedback actuators configured to urge the runner toward a first direction as the runner moves in a second direction opposite the first direction.

20. A method for steering a vehicle including one or more wheels, the method comprising:
   detecting one or more segments of a runner that is moveable relative to a frame at an upper portion of the frame;
   determining a position of the runner relative to the frame based on the detection of the one or more segments; and generating one or more signals based on the position of the runner relative to the frame for use in turning the one or more wheels.

\* \* \* \* \*